US010079696B2

(12) United States Patent
Thiel et al.

(10) Patent No.: US 10,079,696 B2
(45) Date of Patent: Sep. 18, 2018

(54) METHOD FOR THE COMMUNICATION OF SYSTEM CONTROL UNITS WITH A PLURALITY OF ENERGY GENERATING SYSTEMS VIA A GATEWAY, AND CORRESPONDINGLY CONFIGURED AND PROGRAMMED DATA SERVER

(71) Applicant: SMA Solar Technology AG, Niestetal (DE)

(72) Inventors: Raimund Thiel, Bad Zwesten (DE); Dirk Schlote, Kassel (DE); Georg Engelhard, Niestetal (DE)

(73) Assignee: SMA Solar Technology AG, Niestetal (DE)

( * ) Notice: Subject to any disclaimer, the term of this patent is extended or adjusted under 35 U.S.C. 154(b) by 59 days.

(21) Appl. No.: 15/151,741

(22) Filed: May 11, 2016

(65) Prior Publication Data
US 2016/0254929 A1 Sep. 1, 2016

Related U.S. Application Data

(63) Continuation of application No. PCT/EP2014/074123, filed on Nov. 10, 2014.

(30) Foreign Application Priority Data

Nov. 12, 2013 (DE) .................. 10 2013 112 408

(51) Int. Cl.
*H04L 12/54* (2013.01)
*H04L 12/66* (2006.01)
(Continued)

(52) U.S. Cl.
CPC .............. *H04L 12/66* (2013.01); *H04L 5/14* (2013.01); *H04L 12/403* (2013.01)

(58) Field of Classification Search
CPC ......... H04L 12/66; H04L 12/403; H04L 5/14; H04L 5/1415
See application file for complete search history.

(56) References Cited

U.S. PATENT DOCUMENTS 4,777,607 A 10/1988 Maury
8,704,403 B2 4/2014 Boerger et al.
(Continued)

FOREIGN PATENT DOCUMENTS

JP 2006031557 A 2/2006
JP 2012222964 A 11/2012
WO 2012140733 A1 10/2012

OTHER PUBLICATIONS

A. Naumann, et al., Seamless Data Communication and Management Over All Levels of the Power System, 21st International Conference of Electricity Distribution Frankfurt, Jun. 6-9, 2011 Paper 0988 pp. 1-5.
(Continued)

Primary Examiner — Kevin Mew
(74) Attorney, Agent, or Firm — Eschweiler & Potashnik, LLC

(57) ABSTRACT

A method for the communication of system control units with multiple energy generating systems includes receiving request data from the system control units and system data from the energy generating systems at a common gateway, managing the system data and processing the request data in the gateway, and sending control commands to the energy generating systems and/or data responses to the system control units via the gateway. The request data and/or the system data are received in at least two different data models at the gateway, and translated from their respective data models into a metadata model. The translated system data are managed and the translated request data are processed in the gateway, resulting in data responses and/or control
(Continued)

commands in the metadata model that are translated back into the data models of the specific system control units and/or energy generating systems, and transmitted to them by the gateway.

18 Claims, 2 Drawing Sheets

(51) Int. Cl.
    *H04L 12/403*      (2006.01)
    *H04L 5/14*      (2006.01)

(56) References Cited

U.S. PATENT DOCUMENTS

| | | | |
|---|---|---|---|
| 9,130,410 B2 | 9/2015 | Thiel et al. | |
| 9,685,048 B2* | 6/2017 | Angell | G07G 1/00 |
| 9,760,956 B2* | 9/2017 | Magnussen | G06Q 50/06 |
| 2009/0007227 A1 | 1/2009 | Burgess et al. | |
| 2009/0063357 A1 | 3/2009 | Munger et al. | |
| 2010/0020724 A1 | 1/2010 | Wimmer | |
| 2010/0332373 A1* | 12/2010 | Crabtree | G06Q 40/04 |
| | | | 705/37 |
| 2011/0004446 A1* | 1/2011 | Dorn | G01D 4/002 |
| | | | 702/188 |
| 2011/0208366 A1* | 8/2011 | Taft | H04L 29/08846 |
| | | | 700/295 |
| 2011/0221269 A1 | 9/2011 | Boerger et al. | |
| 2011/0231159 A1 | 9/2011 | Allert et al. | |
| 2012/0151086 A1 | 6/2012 | Xie et al. | |
| 2012/0198251 A1* | 8/2012 | Boldryev | G06F 9/5088 |
| | | | 713/310 |
| 2013/0086219 A1* | 4/2013 | Thiel | H04L 67/12 |
| | | | 709/218 |
| 2013/0103839 A1 | 4/2013 | Grimstrup et al. | |
| 2013/0246109 A1* | 9/2013 | Jain | G06F 11/3006 |
| | | | 705/7.12 |
| 2013/0297320 A1* | 11/2013 | Buser | B33Y 40/00 |
| | | | 704/275 |
| 2013/0304708 A1 | 11/2013 | Ritchie et al. | |
| 2014/0059443 A1* | 2/2014 | Tabe | H04L 51/32 |
| | | | 715/738 |
| 2014/0277788 A1* | 9/2014 | Forbes, Jr. | G05F 1/66 |
| | | | 700/286 |
| 2015/0094968 A1* | 4/2015 | Jia | G06Q 40/04 |
| | | | 702/60 |
| 2015/0271557 A1* | 9/2015 | Tabe | H04N 21/4788 |
| | | | 725/14 |
| 2016/0261425 A1* | 9/2016 | Horton | G05B 15/02 |
| 2016/0364963 A1* | 12/2016 | Matsuoka | H04R 3/00 |
| 2017/0163733 A1* | 6/2017 | Grefen | H04L 67/1097 |
| 2017/0192402 A1* | 7/2017 | Karp | F24F 11/30 |

OTHER PUBLICATIONS

International Search Report dated Jan. 20, 2015 PCT/EP2014/074123.

\* cited by examiner the devices and from potential communication partners of the devices, data are communicated to a server via the Internet, said data in each case comprising a communication address and furthermore attributes indicating generic properties of the devices and of the communication partners. As a reaction to an initializing time-variable datum, the server establishes a communication connection between at least one specific device and at least one specific communication partner via the Internet. For this purpose, rules are programmed in the server, which rules, on the basis of the attributes of the devices and of the communication partners and the initializing time-variable datum, stipulate between which device and which communication partner the communication connection is established. The communication connection can be a point-to-point connection, a point-to-multipoint connection or a multipoint-to-multipoint connection.

METHOD FOR THE COMMUNICATION OF SYSTEM CONTROL UNITS WITH A PLURALITY OF ENERGY GENERATING SYSTEMS VIA A GATEWAY, AND CORRESPONDINGLY CONFIGURED AND PROGRAMMED DATA SERVER

CROSS REFERENCE TO RELATED APPLICATIONS

This application claims priority to International Patent Application number PCT/EP2014/074123, filed on Nov. 10, 2014, which claims priority to German Patent Application number 10 2013 112 408.9, filed on Nov. 12, 2013, and is hereby incorporated by reference in its entirety.

FIELD

The disclosure relates to a method for the communication of system control units with a plurality of spatially distributed energy generating systems, which jointly feed into a continuous supply network for electrical energy. In particular, the present disclosure relates to a related method and to an implementation of such a method by a correspondingly configured and programmed data server.

BACKGROUND

WO 2010/058013 A2 discloses a method for forwarding operating data to a monitoring unit, said operating data relating to the present operation of a plurality of inverter units. The inverter units feed electrical power into a supply network. In the known method, the inverter units are connected to the central monitoring unit via a plurality of interposed data handling units in a network having a logical tree architecture. The operating data are forwarded from each inverter unit to the interposed unit to which the inverter unit is connected. In each interposed unit that forwards the operating data, operating data of the same type are combined in order to reduce the data volume. Only the combined operating data are forwarded. The forwarding of the operating data to the central unit can be initiated by a generic request that is output by the monitoring unit and indicates that each unit in the communication network that is able to supply the operating data asked for should do so. The operating data can also be regularly forwarded from one unit to the next in the communication network toward the monitoring unit on account of a subscription of the operating data. A further monitoring unit can also be connected to the communication network. Operating data already present are managed in a data handling unit that is usable as an interposed unit in this known method. The data handling unit comprises a connection port for receiving requests for values from a superordinate unit and for forwarding the operating data asked for to the superordinate unit, and a further connection port for sending request data for values to a plurality of subordinate units and for receiving the requested operating data from the subordinate units. In the known method, the requests for operating data and the forwarding of the requested operating data are carried out across all levels of the communication network according to a specific protocol that makes it possible to combine operating data of the same type that are forwarded by the plurality of inverter units, without the data model of the data being altered.

The method known from WO 2010/058013 A2 is suitable only for communication between inverter units, data handling units and monitoring units set up specifically for this method.

DE 10 2012 109 060 A1 discloses a method for communication with decentralized devices that handle electrical energy via the Internet. In this known method, from the devices and from potential communication partners of the devices, data are communicated to a server via the Internet, said data in each case comprising a communication address and furthermore attributes indicating generic properties of the devices and of the communication partners. As a reaction to an initializing time-variable datum, the server establishes a communication connection between at least one specific device and at least one specific communication partner via the Internet. For this purpose, rules are programmed in the server, which rules, on the basis of the attributes of the devices and of the communication partners and the initializing time-variable datum, stipulate between which device and which communication partner the communication connection is established. The communication connection can be a point-to-point connection, a point-to-multipoint connection or a multipoint-to-multipoint connection.

The method known from DE 10 2012 109 060 A1 also presupposes, for successful communication between the respective devices and the communication partners thereof, that they are suitable for direct data exchange among one another.

DE 10 2007 022 879 A1 discloses an inverter for grid feeding into an AC grid, which inverter, on the input side, is connectable to a generator that generates electrical energy, and comprises a data connection to a data network to which are connected a multiplicity of further inverters with further electricity generators for feeding electricity into the AC grid. The data network together with the connected inverters forms a communication unit, wherein the individual inverters are controlled by a control unit via the data network such that a power plant unit that is uniform with regard to feeding-in parameters is present. Said power plant unit can be connected as an external unit having a combined supervisory and control structure in an interconnected electricity grid. It is also referred to as a virtual power plant. However, such a virtual power plant presupposes the suitability of all associated inverters for being connected to the data network such that they are controllable by the control unit via the data network.

WO 2011/116770 A2 discloses a method and a system for providing data from a subordinate device to a superordinate computer connected to the superordinate device. In that case, a data stream between the subordinate device and the superordinate computer is translated from a low data format to a higher data format in the superordinate computer. The translation function comprises static data relating to the subordinate device. The higher data format is used to display data from the subordinate device at the superordinate computer. In this regard, the data from the subordinate device can be accessed via the communication interfaces of the superordinate computer.

Naumann, B.-M. Buchholz, P. Komarnicki, Ch. Brunner: "Seamless data communication over all levels of the power system"; CIRED, Proceeding of the 21st International Conference and Exhibition on Electricity Distribution, Frankfurt am Main, Jun. 6-9, 2011 (http://www.cired.net/publications/cired2011/part1/papers/CIRED2011 0988 final.pdf) discloses a method for communication within an energy supply system with a plurality of spatially distributed energy generating systems in order to form a virtual power plant. In order to combat the problem of different communication protocols and information systems that do not enable seamless exchange of information between the different levels of the energy supply system, a homogeneous protocol between and within all levels of the energy supply system is described. Units, such as measuring instruments and automation devices, which do not use said homogeneous profile themselves are provided with gateways in order to be able to communicate with them as well via the homogeneous protocol. Even with a common information model that internally follows a different standard, all units communicate via the homogeneous protocol, the values of which are mapped onto the corresponding attributes of the standard of the common information model.

The increasing prevalence of decentralized energy generating systems connected at different points to a supply network for electrical energy makes it increasingly difficult to monitor and influence parameters of such a supply network and, in particular, to effect targeted concerted control of all or at least all important energy generating systems that are connected to the supply network. These difficulties increase greatly with the number of data models in which the energy generating systems output their operating data. This holds true particularly if a plurality of system control units are present which in parallel want to request system data from the energy generating systems and/or to influence the operation of the energy generating systems. One example of parallel interventions by two system control units is a network control center that is intended to balance the supply of electrical power and the consumption of electrical power over the entire supply network, and a local monitoring device that is intended to comply with specific network parameters at specific points of the supply network. In this case, a local equilibrium of supply and demand of electrical power may be of importance for complying with said network parameters, which local equilibrium may be disturbed even if the supply of and the demand for electrical power in the supply network overall are balanced.

Considerable effort is currently being expended in order to upgrade energy generating systems for communication with different system control units. For this purpose, with high outlay, the energy generating systems are provided with different interfaces adapted to the potential interfaces of the system control units. Even if many different interfaces were set up at an energy generating system, over the planned long lifetime of an energy generating system it is nevertheless likely, however, that it will not have a matching interface for a new system control unit using a newer data model.

DESCRIPTION OF THE DISCLOSURE

The disclosure addresses the problem of disclosing a method for the communication of system control units with a plurality of spatially distributed energy generating systems, which jointly feed into a continuous supply network for electrical energy, which method places only minor demands on the system control units and energy generating systems involved and nevertheless has a high functionality.

The disclosure proceeds from a method for the communication of system control units with a plurality of spatially distributed energy generating systems, which jointly feed into a continuous supply network for electrical energy, wherein request data from the system control units and system data from the energy generating systems are received at a gateway that is operating as a common gateway. The system data are managed in the gateway and the request data are processed in the gateway, and wherein the gateway sends control commands to the energy generating systems and/or data responses to the system control units that result from the processing of the request data.

According to the disclosure, in such a method, the request data in at least two different data models of the individual system control units and/or the system data in at least two different data models of the individual energy generating systems are received at the gateway. That is to say that each system control unit and each energy generating system send their request data and system data, respectively, in a data model of some kind, wherein at least two different data models are used on the part of the system control units and/or the energy generating systems. In addition, the data models of the system control units, on the one hand, and the data models of the energy generating systems, on the other hand, can also differ. For the method according to the disclosure, therefore, at the individual system control units and energy generating systems it is not necessary to take precautions for a corresponding data model of all the system control units and energy generating systems.

Rather, in the method according to the disclosure, the request data and the system data are translated from their respective data models into a metadata model in the gateway. The management of the system data and the processing of the request data in the gateway are carried out in said metadata model. Data responses to specific system control units and/or control commands to specific energy generating systems result therefrom in the metadata model. Said data responses and/or control commands are translated from the metadata model into the data models of the specific system control units and/or energy generating systems in the gateway. Only these translated data responses and/or control commands are transmitted by the gateway to the specific system control units and/or energy generating systems. In the method according to the disclosure, therefore, the gateway communicates with each connected system control unit and each connected energy generating system via a translator into or from the metadata model. All activities of the gateway that go beyond that in the method according to the disclosure are carried out in the metadata model, that is to say in a uniform language, entirely independently of the system control unit and energy generating system from which the request data and system data respectively taken into account here originate and the data model in which they were communicated to the gateway.

It goes without saying that the metadata model should be designed such that all data points in all data models in which data are received at the gateway can be mapped during the translation into the metadata model. In one embodiment, each data point from each data model is mapped into exactly one data point in the metadata model. This is not mandatory, however, because a mapping into a plurality of data points of the metadata model is also possible. Conversely, the data models need not be able to ensure that all data points from the metadata model can be mapped into the respective data model.

The incorporation of a new system control unit or of a new energy generating system into this communication requires only a single additional translator into or from the common metadata model even if said system control unit or energy generating system uses a different data model than all the previous system control units or energy generating systems. It is not necessary for instance to set up additional translators from the new data model into all data models already used previously, and back. Even new data models can thus be taken into account with little outlay; moreover, this taking into account is necessary only at the central location of the gateway, not at the individual system control units and energy generating systems that communicate with one another via the gateway.

The request data and system data from the different system control units and energy generating systems, respectively, and correspondingly the data responses and control commands to the different system control units and energy generating systems, respectively, may differ not only in their data models but also in the communication protocols and/or communication paths used for communicating them. The differences may be to such an extent that different physical data ports are required for the communication. Conversely, it is also possible to communicate data in different data models in accordance with the same communication protocols and on the same communication paths, i.e. in particular via the same data ports.

A star-type communication structure with the gateway at the center of the star is employed in the method according to the disclosure.

In one embodiment, in the method according to the disclosure, in the gateway a network model of the supply network and of the feeding-in energy generating systems is taken into account during the processing of the translated request data in the gateway. Without such a network model, the system data have to map the assignment of the energy generating systems to specific regions of the supply network to an extent as necessary for the processing of the request data from the system control units.

If a network model of the supply network is used in the gateway, it is maintained in one embodiment, i.e. updated as necessary after being set up.

In the method according to the disclosure, the gateway can autonomously transmit control commands to the energy generating systems, even without request data being present, in order to ask for system data from the energy generating systems. Said system data can then be used e.g. to maintain the network model of the supply network in the gateway. Another possibility for the use of system data asked for in this way consists in being able to react rapidly to request data with respect to specific present operating parameters from the system control units, without having to ask for these operating parameters first in the form of system data from the individual energy generating systems in response to such request data.

It should be noted at this juncture that the use of the term "system control unit" here does not mean that each of the system control units emits request data that have controlling effects on the energy generating systems. Individual or even all of the system control units may also be restricted to interrogating state and/or system data. Accordingly, "sending request data" from a system control unit may firstly pursue the purpose of obtaining state or system data of the energy generating systems. Secondly, this may pursue the aim of having a controlling influence on the present operating state of all or individual energy generating systems addressed. The first case thus characterizes a "read request", while the second case characterizes a "write request" on the part of the system control unit.

Likewise, the control commands that are transmitted by the gateway to the energy generating systems, besides commands with regard to a specific mode of operation of the energy generating systems, may also be directed only to communication of system data.

In the method according to the disclosure, state data for measuring devices can furthermore be received at the gateway. Said state data can then be translated from their respective data models into the metadata model in the gateway, and the translated state data can additionally be managed in the gateway. The state data, alongside the system data, can influence the data responses formulated and transmitted by the gateway and, in particular, can also be used to check whether control commands transmitted by the gateway had a desired effect. It is likewise possible for the gateway to receive weather forecast data and to use the latter for the purpose of controlling the energy generating systems or else for informing the system control units. In this regard, it may be expedient to inform a superordinate system control unit about future expected changes in the energy feeding-in of individual energy generating systems in order that it has enough lead time—for example with regard to time-consuming upward and/or downward regulation of conventional power plants for energy generation—to be able to make a network-supporting intervention. Even a combined upward regulation of a conventional power plant for energy generation with a simultaneous, oppositely directed downward regulation of individual decentralized energy generating systems that are connected to the same energy supply network is possible with the objective of keeping the power fed in overall—at least for the duration of the regulation—as constant as possible. In this way, in the event of a natural fluctuation of the fed-in power of a plurality of energy generating systems on account of changes in weather in the region thereof, a network-supporting intervention can be made in advance.

In the method according to the disclosure, control commands resulting from request data can be transmitted in a temporal sequence by the gateway. In this regard, for example, firstly a control command can be transmitted to specific energy generating systems in order to interrogate specific operating parameters from the latter. As soon as these operating parameters have been obtained in the form of system data from said energy generating systems, the gateway can formulate therefrom a data response, which is then transmitted to the requesting system control unit. In the method according to the disclosure, the gateway can also repeat specific control commands once or a number of times in order to ensure that a specific objective that was set by received request data is achieved. In this regard, in the case of a surplus of electrical power at a specific point of the supply network from the energy generating systems connected to the supply network in the vicinity of this point it is possible to demand a reduction of the power fed into the supply network by said energy generating systems by a specific percentage compared with the power last fed in thereby. The corresponding control commands can be repeated and/or modified—for example on the basis of updated state data—a sufficient number of times until the surplus of electrical power at the point is eliminated. Furthermore, it is possible to repeat control commands to energy generating systems which automatically revert to their original operating state after a specific time.

The gateway can also independently generate control commands to the energy generating systems in order to pursue an objective stored in the gateway and/or a global objective defined in the request data of the system control units. The global objective may be, for example, a downward regulation to x % of the maximum possible feeding-in power of a virtual power plant made of a plurality of the energy generating systems. For this purpose, it is necessary continuously to determine the present value of the maximum possible feeding-in power and to control the virtual power plant made of the plurality of energy generating systems taking account of said value. One method for this purpose is operation of individual energy generating systems at the maximum power point (MPP) and greater downward regulation of the remaining energy generating systems. An objective additionally stored in the gateway here may involve cyclically exchanging the energy generating systems operated at the MPP. This prevents one and the same operators of the energy generating systems from being constantly burdened with downward regulation, while the operators of the other energy generating systems feed in energy. In addition, such a cyclic exchange results in a more reliable statement of the actual magnitude of the maximum possible feeding-in power.

In the method according to the disclosure, in the gateway it is also possible to implement the function that request data from different system control units are checked for collision among one another before or during the processing and, in the event of collisions occurring, are firstly fed jointly to a collision eliminating routine. In this regard, request data from different system control units that pursue different objectives in different subregions of the supply network may result in mutually opposite control commands, in principle. Such conflicting control commands are prevented by the collision eliminating routine, for example by one of the objectives being subordinated to the other or a new superordinate objective being formulated that takes account of both individual objectives in part according to a predefined weighting.

Even if different request data indicate no collision among one another before the processing, a collision may arise during the processing of the request data. It may be triggered for example by a control command to individual energy generating systems which is generated independently by the gateway and which is allowed within an objective of the request data of one system control unit, but collides with an objective of the request data of another system control unit. Such a collision can also be dispelled by the collision eliminating routine.

The method according to the disclosure can also be implemented in a cascaded manner, by at least one of the control units from which request data are received at the gateway being a further gateway, to which the gateway considered initially here is connected as an energy generating system. A more than two-stage cascade is also possible.

In the method according to the disclosure, the request data received at the gateway may relate to compliance with at least one network parameter at at least one point of the supply network. Said network parameter may be a phase angle between current and voltage in an AC grid, a voltage and/or a frequency and/or the distribution thereof over the supply network.

In the method according to the disclosure, the request data may also relate to the communication of operating data of the totality of the energy generating systems or of a subset of the energy generating systems that is defined generically in the request data. The gateway then processes such a generic request such that concrete control commands are issued to individual energy generating systems if the operating data of interest are not already present in the gateway and a corresponding data response can be compiled from this stock. In this case, it is possible, in particular, for the gateway to calculate from system data present separately a new value, not yet present initially, by means of a suitable algorithm and to forward it to the system control unit. In this regard, for example, from the respectively presently available feeding-in powers of individual energy generating systems by means of a summation of all the energy generating systems connected to a specific network node, it is possible to determine a power fed in overall at the network node. In a similar manner, it is also possible, upon downward regulation of a plurality of energy generating systems and of individual energy generating systems operated with maximum feeding-in, to calculate a positive control power kept available overall by the energy generating systems operated with downward regulation. This calculation can be updated at defined time intervals and communicated to the system control unit by the gateway. On account of the cyclic updating, this value, despite fluctuating weather conditions, represents relatively certain information of how much positive control power can really be retrieved when required.

The system data received from the energy generating systems at the gateway can comprise, in particular, identification data that enable an unambiguous identification of the energy generating system sending the system data, and/or present operating parameters of the respective energy generating system. Furthermore, the system data can comprise generic descriptions of the respective energy generating system and/or position indications that indicate, for example, at what point the respective energy generating system is connected to the supply network. However, such generic descriptions and position indications can also be entered exclusively into a network model of the supply network that is created in the gateway. Generic descriptions of an energy generating system indicate e.g. its type, its power class or the like and can be used to satisfy corresponding generic requests from system control units.

In the case of energy generating systems in the form of PV systems, the system data can furthermore comprise indications concerning the geographical position and/or concerning the alignment of the PV generator assigned to the PV system. The alignment of the PV generators in the case of PV systems distributed in a decentralized manner is generally ground-fixed. The insolation thus changes over the course of the day with the position of the sun. Therefore, the alignment and also the position of the PV generator of a PV system are of great importance for the processing of request data from system control units. The position is of great importance in order to establish a relation to a local weather forecast. Both indications influence e.g. the manner in which an objective defined in request data from a system control unit is expediently concretely implemented by the gateway by means of control commands to the individual energy generating systems at issue.

When data responses to data requests are created in the gateway, the gateway can mix data originating directly from system data from the energy generating systems or other units, such as measuring devices, for example, with data stored in the gateway. For the requesting system control unit it need not be identifiable whether the data contained in the data response originate directly from a concrete energy generating system, from one or a plurality of generically addressed energy generating systems, from a plurality of energy generating systems combined to form a virtual power plant, and/or from a memory of the gateway.

In the method according to the disclosure, it is desirable in one embodiment if the request data and/or the system data and also the translated data responses and/or control commands are received and/or transmitted to the specific system control units and/or energy generating systems by the gateway via protected data connections. In this case, the advantageousness of such protected data connections may depend on the data model and the communication protocol in which the data are transferred between the gateway and the respective system control unit and/or the respective energy generating system. A certain data security and at the same time a functional reliability for the method according to the disclosure are also achieved if the reception of all the request data and system data and of each data response and of each control command is confirmed by the receiving unit to the sending unit. If reception is not confirmed, the sending unit can repeat the sending. If even this is unsuccessful, an error can be signaled to a monitoring unit.

In the method according to the disclosure, the gateway can transmit the translated data responses and/or control commands via at least two separate data ports to the specific system control units and/or energy generating systems, wherein a data port should be understood to mean a specific physical connection of the gateway for transmitting the data in a wireless or wired manner. In this case, one data port can be provided for the part of the communication between the gateway and the system control units and another data port can be provided for the communication between the gateway and the energy generating systems. However, it is also possible to provide different data ports for different system control units and/or different energy generating systems. In addition, the communication protocols used for the communication between the gateway and the individual system control units and energy generating systems may also differ to such an extent that they would not be transferrable via the same data port. In principle, however, the gateway can also comprise just a single data port, such as an internet connection, for example, via which it communicates with all the system control units and all the energy generating systems.

A data server according to the disclosure is configured and programmed such that it performs the method according to the disclosure, as described above, as a gateway. The spatial arrangement of such a data server relative to the energy generating systems and system control units is free depending on the data connections formed between them. In principle, the data server can also be arranged at the location of a system control unit or else of an energy generating unit. It can additionally also be designed as a further system control unit.

Advantageous developments of the disclosure are evident from the patent claims, the description and the drawings. The advantages of features and of combinations of a plurality of features as mentioned in the description are merely by way of example and can come into effect alternatively or cumulatively, without the advantages necessarily having to be achieved by embodiments according to the disclosure. Without the subject of the accompanying patent claims being altered thereby, the following applies to the disclosure content of the original application documents and of the patent: further features can be gathered from the drawings— in particular from the illustrated relative arrangement and operative connection of a plurality of components. The combination of features of different embodiments of the disclosure or of features of different patent claims is likewise possible departing from the chosen dependency references of the patent claims and is suggested hereby. This also concerns such features that are illustrated in separate drawings or are mentioned in the description thereof. These features can also be combined with features of different patent claims. It is likewise possible to omit features presented in the patent claims for further embodiments of the disclosure.

The features mentioned in the patent claims and in the description should be understood, with regard to their number, such that exactly this number or a greater number than the number mentioned is present, without the need for explicit use of the adverb "at least". Therefore, if an element is mentioned, for example, this should be understood to mean that exactly one element, two elements or more elements are present. These features can be supplemented by other features or be the sole features of which the respective product consists.

The reference signs contained in the patent claims do not restrict the scope of the subjects protected by the patent claims. They merely serve the purpose of making the patent claims more easily comprehensible.

BRIEF DESCRIPTION OF THE FIGURES

The disclosure is explained and described in greater detail below on the basis of concrete exemplary embodiments with reference to the accompanying drawings.

DESCRIPTION OF THE FIGURES

Figure 1:
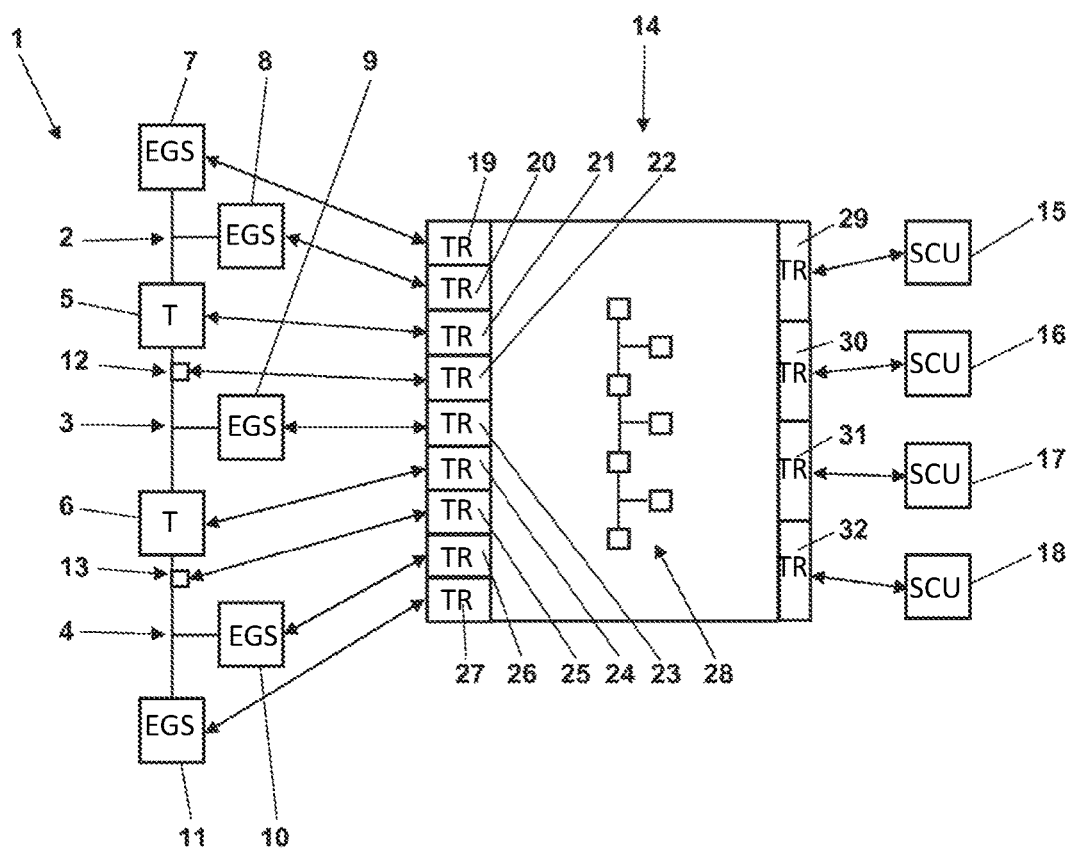
FIG. 1 illustrates the interposition of a gateway according to the disclosure between a plurality of energy generating systems that feed into an energy supply network, on the one hand, and system control units, on the other hand.

FIG. 1 schematically depicts on the left a supply network 1 for electrical energy. The supply network 1 consists of three subregions 2 to 4, between which transformers (T) 5 and 6 are connected. Spatially distributed energy generating systems 7 to 11 feed into the different regions 2 to 4 of the supply network 1. Measuring devices 12 and 13 detect network parameters of the supply network 1 in the regions 3 and 4. The transformers 5 and 6, the energy generating systems (EGS) 7 to 11 and the measuring devices 12 and 13 are also referred to here jointly as units 5 to 13. Electrical loads connected to the supply network 1 are not illustrated in FIG. 1, for reasons of clarity, although they are present, of course, in the real case. The units 5 to 13 illustrated in FIG. 1 communicate with a gateway 14 and, via the gateway 14, with system control units (SCU) 15 to 18. In addition, identical or similar units can also be provided in or at the supply network 1 as well, but they are not illustrated here because they do not communicate with and via the gateway 14.

For each of the units 5 to 13, a translator (TR) 19 to 27 is provided at the gateway 14. The translators 19 to 27 translate system data from the units 5 to 13 and state data from the measuring devices 12 and 13 from a data model of the respective unit 5 to 13 in which they are communicated to the gateway 14 into a uniform metadata model. Conversely, the translators 19 to 21, 23 and 24 and 26 and 27 translate control commands from the gateway from the metadata model into the data models in which they are transferred to the units 5 to 13 and understood there. The translators 19 to 27 can additionally take account of different communication protocols in the communication with the individual units 5 to 13. If a plurality of the units 5 to 13 use the same data models and communication protocols, individual or a plurality of the translators 19 to 27 can also be designed identically, or a single translator can be provided instead of a plurality of said translators. The system data and state data that were translated into the metadata model are managed in the gateway 14, i.e. in particular buffer-stored, to be precise directly or after conditioning. In this case, the management of the system data and state data is based on a network model 28 of the supply network, or at the very least said network model 28 is taken into account in the management of the system data and state data.

Besides pure management, the gateway 14 can also calculate new data points from the data available to it. It can thus supplement data points that were not yet present beforehand but may be of interest for a system control unit 15 to 18. They include for example a control power kept available or a maximum possible feeding-in power of a cluster of energy generating systems 7 to 11 operated with downward regulation, and also other operating data of such a cluster.

The gateway 14 can also implement a superordinate control command of a system control unit 15 to 18 in its own way. In this regard, e.g. in the case of a cluster of energy generating systems 7 to 11 operated with downward regulation in the supply network 1 in which individual energy generating systems 7 to 11 are operated at the MPP, it is not necessary to operate always the same energy generating systems 7 to 11 at the MPP. Rather, the gateway 14 can autonomously send control commands to the individual energy generating systems 7 to 11 with the objective of exchanging the energy generating systems 7 to 11 operated at the MPP in the supply network 1 cyclically with energy generating systems 7 to 11 operated with downward regulation. In this case, the gateway 14 can decide which real energy generating systems 7 to 11 are operated at the MPP and which are subjected to downward regulation. What is crucial is that the control command of the system control unit 15 to 18 is complied with. The way in which that is done can, however, be left to the discretion of the gateway 14 to the greatest possible extent.

The gateway 14 additionally receives request data from the system control units 15 to 18, wherein translators 29 to 32 are provided here, too, which translate the request data communicated in different data models and, if appropriate, also in accordance with different communication protocols into the metadata model of the gateway 14. The request data from the system control units 15 to 18 are processed in the gateway 14. If the request data relate to system data or state data already present in the gateway 14, data responses to the request data are generated directly in the metadata model. These data responses are then translated by the translators 29 to 32 assigned to the system control units 15 to 18 involved into the data model of the respective system control unit 15 to 18 and are communicated to the respective system control unit 15 to 18 in accordance with the communication protocol appropriate therefor. The data requested with the request data may be directly system data, but also combined system data or system data conditioned in some other way. The combined system data or system data conditioned in some other way may comprise new data points which are calculated from individual system data and thus newly generated only within the gateway 14. Mention may be made here of, for example, conditioned operating data concerning a cluster made of a plurality of energy generating systems 7 to 11 that are operated in the form of a virtual power plant with regard to a common control command of the system control unit 15 to 18. If the system data required for the data responses are not present in the gateway 14, the gateway 14 generates control commands to the units 5 to 13 in the metadata model. Said control commands are then translated by the translators 19 to 27 into the data models of the respective unit 5 to 13 and transferred in the respective communication protocol. As a response to the control commands, new system or state data are then received via the translators 19 to 27 and processed in the metadata model to form the data responses. Said data responses are then communicated to the system control units 15 to 18 via the translators 29 to 32.

In the case of request data from the system control units 15 to 18 which are directed e.g. to the setting or control of specific network parameters of the supply network 1, control commands are likewise generated in the metadata model and are then communicated to the corresponding units 5 to 13 via the translators 19 to 27. In this case, the request data, either if they relate to the communication of system or state data or else if instructions with regard to specific network parameters are involved, need not yet have a relation to individual units from among the units 5 to 13. Rather, said relation can be established by the gateway 14 on the basis of the network model 28 or on account of generic indications that are communicated by the units 5 to 13 in their system or state data.

The different translators 19 to 27 and 29 to 32 illustrated in FIG. 1 may also correspond to different data ports of the gateway 14. The data models that are translated into the metadata model by the translators 19 to 27 and 29 to 32, and vice versa, may be for example IEC 61850, SunSpec or other OPC-based data models. The data models translated by the translators 29 to 32 may differ from the data models 33 to 35 translated by the translators 19 to 27, but this may also involve the same data models 33 to 35. With the data models 33 to 35 may also be identical.

In this case, a translation of request data from a data model 33 to 35 of a requesting system control unit 15 to 18 into the metadata model 36 and a subsequent translation from the metadata model 36 into a data model 33 to 35 of one of the units 5 to 13 that is identical to the original data model 33 to 35 may appear to be unnecessary. This is also the case in principle. However, such a procedure is indeed advantageous though with regard to completion and/or updating of the data points in the metadata model 36, and also standardized processing of request data and/or system data arriving in the gateway 14 and of control commands and/or data responses sent by the gateway 14.

The metadata model of the gateway 14 defines data points that are exchanged between the system control units 15 to 18 and the units 5 to 13. The gateway 14 has its primary function as a mediator of the data flows between the units 5 to 13 and the system control units 15 to 18. However, in this case, the mediation of these data streams is carried out not only by pure routine, but also by aggregation and more extensive processing of the data through to the generation of new data points from data points already present or data points to be interrogated within the gateway 14. A more extensive function of the gateway 14 presents itself in that the gateway 14 can independently generate control commands to individual energy generating systems 7 to 11 on the basis of request data obtained from the system control units 15 to 18. The generated control commands are firstly subordinate to the superordinate request data of a system control unit 15 to 18 and must therefore conform overall to said superordinate request data. However, the way in which the respective superordinate request data are implemented in detail can be decided partly or wholly within the gateway 14 and also by the gateway 14 itself. This is explained below by way of example on the basis of concrete request data of a specific system control unit 15 to 18:

In the example, the request data from the control unit 15 to 18 shall be directed to keeping available a specific amount of positive control power at a predefined point within the supply network 1. A method for implementing these request data is then carried out in such a way that the totality of the energy generating systems 7 to 11 at issue which are connected to the predefined point of the supply network 1 is firstly identified by means of the network model 28. From this totality of the energy generating systems 7 to 11 at issue, individual energy generating systems 7 to 11 are then operated at their maximum possible feeding-in power, i.e. at the MPP, while the remaining energy generating systems 7 to 11 of the totality of the energy generating systems 7 to 11 at issue are operated with downward regulation in such a way that the positive control power predefined on the part of the system control unit 15 to 18 is complied with in total by way of the totality of the energy generating systems 7 to 11 at issue. In this case, the energy generating systems operated at the MPP serve for estimating presently maximum possible feeding-in power—and thus also the positive control power kept available—of the totality of the energy generating systems 7 to 11 at issue that is operated overall with downward regulation.

In this example, the superordinate request data that have to be implemented overall by the control commands of the gateway 14 are directed to complying with the predefined positive control power. In this case, the gateway 14 can partly or wholly independently define which individual energy generating systems 7 to 11 from the totality of the energy generating systems 7 to 11 at issue are subjected to downward regulation and to what extent, and which energy generating systems are operated in parallel therewith as reference at their maximum possible feeding-in power. In particular, the energy generating systems 7 to 11 respectively serving as reference can also be exchanged cyclically with other energy generating systems 7 to 11 from the totality of the energy generating systems 7 to 11 at issue, as long as in total the positive control power kept available is complied with. The cyclic interchange of the energy generating systems serving as reference can also be decided autonomously by the gateway 14 and implemented by the communication of corresponding control commands to the energy generating systems 7 to 11.

The processing of the request data from the system control devices 15 to 18 within the gateway 14 can be carried out by building up a transaction stack that is loaded with each new request from the top and monitors the linkages of the respective requesting system control unit 15 to 18 with the associated units 5 to 13 or the system and state data originating therefrom for each request contained in the request data. In this case, the requests can be processed sequentially and/or in parallel.

The gateway 14 can also perform functions without (new) request data being present. It is possible to repeat control commands to energy generating systems 7 to 11 and transformers 5 and 6 which otherwise revert to their initial state. The gateway 14 can also automatically interrogate system data from the units 5 to 13 by means of control commands in order to calculate new data points therefrom. The gateway 14 can signal alarm states which it identifies on the basis of the system data communicated by the units 5 to 13 or the data points created or conditioned therefrom. The gateway 14 can store request data and data responses for documentation. Likewise for documentation, state data and system data from the units 5 to 13 can be documented in the gateway 14, without corresponding requests being present.

Figure 2:
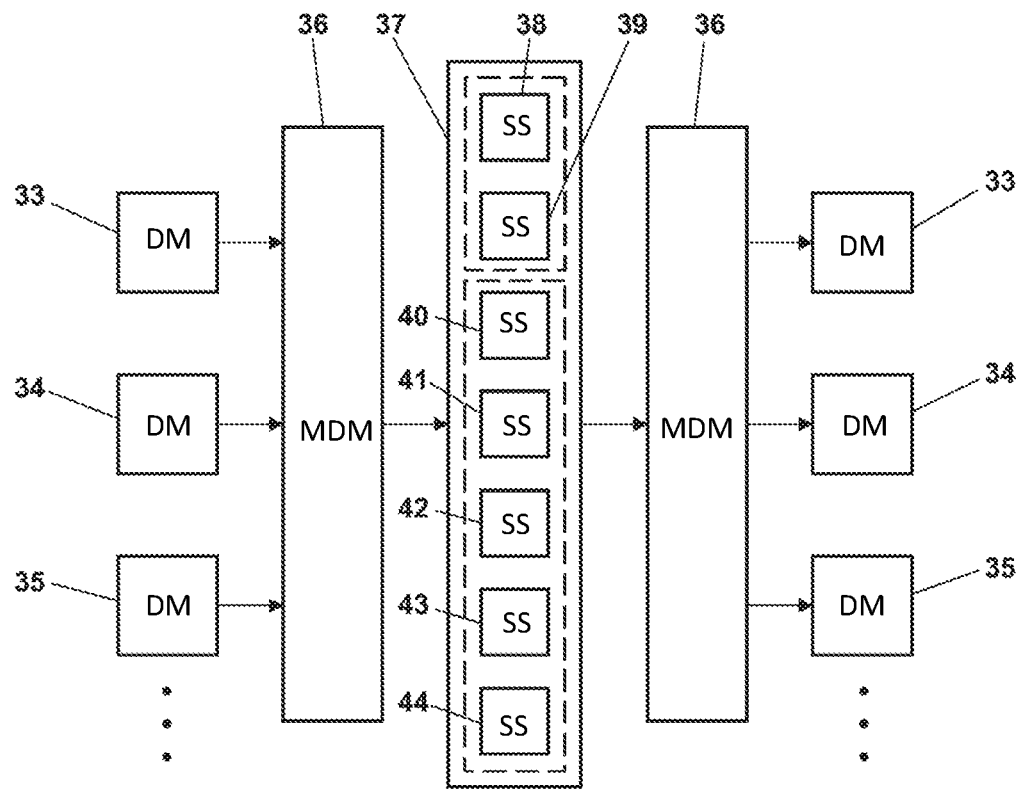
FIG. 2 is a block diagram of the function of the gateway in accordance with FIG. 1.

FIG. 2 is a schematic block diagram concerning the function of the gateway 14 in accordance with FIG. 1. Various data models (DM) 33 to 35 are indicated on the left, in which system data, state data or request data are received. These data are all translated into a metadata model (MDM) 36. A processing 37 of the data is then carried out. Substeps (SS) 38 to 44 of the processing 37 are indicated here. A substep 38 denotes a direct mediation of data. A substep 39 denotes a storage of the corresponding data transactions. A substep 40 denotes the application of a control algorithm in the gateway 14 in accordance with FIG. 1 in order to implement a specific instruction contained in request data of a system control unit 15 to 18. A substep 41 denotes an aggregation of data in the gateway 14 to form new data points. A substep 42 denotes a repetition of control commands. A substep 43 denotes a recording of data for documentation purposes, and a substep 44 denotes alarm signaling in the case of irregular states that are detected by the gateway 14. The results of the processing 37 are translated from the metadata model 36 again into the data models 33 to 35, in which the control commands or data responses resulting from the processing are transferred to the respective units 5 to 13 or system control units 15 to 18.

In one concrete example, a control room of a network operator as system control unit 15 to 18 sends request data to the gateway, said request data containing a request for a measurement value, e.g. for the present total power of the energy generating systems 7 to 11. In this case, the system control unit 15 to 18 uses a data model 33 to 35 agreed on beforehand by the operator of the gateway 14 and the operator of the system control unit 15 to 18, such that a corresponding translator 29 to 32 is kept available at the gateway 14. Said translator converts the request data from the data model 33 to 35 into the metadata model 36 of the gateway 14. The gateway 14 then processes the translated request taking account of the network model 28 and determines the units 5 to 13 to be addressed for replying to the request. Control commands in the associated data models 33 to 35 are then transmitted to said units via the corresponding translators 19 to 27. The system data thereupon obtained in return are translated back into the metadata model 36 by the translators, if appropriate combined, conditioned or used for calculating a new data point. The gateway 14 then generates a data response from the system control unit 15 to 18, which is output to the requesting system control unit 15 to 18 via the respective translator 29 to 32.

The system control units 15 to 18, in their request data, can address all the energy generating systems 7 to 11 or else subgroups thereof as a virtual power plant, without the system control units 15 to 18 having to know the exact composition of these virtual power plants in this case, provided that said composition is stored in the network model 28 of the gateway 14. For this purpose, they do not have to communicate directly with the individual energy generating systems 7 to 11, but rather indirectly via the gateway 14. In this case, the gateway 14 calculates data points that are of interest for a system control unit 15 to 18 but typically are not present in the individual energy generating systems 7 to 11 and—taking account of the gateway 14—need not be present either. The data points of interest for the system control units 15 to 18 often emerge only upon an overview consideration of the energy generating systems 7 to 11 respectively at issue. According to the disclosure, this overview consideration is carried out at a central location, namely within the gateway 14. This avoids having to keep operating data of a specific energy generating system 7 to 11 in other energy generating systems 7 to 11. The complexity of the communication of one or a plurality of system control units 15 to 18 with a plurality of energy generating systems 7 to 11 is significantly reduced as a result.

The invention claimed is:

1. A method for the communication of system control units with a plurality of spatially distributed energy generating systems, which jointly feed into a continuous supply network for electrical energy, comprising:
  receiving request data from the system control units and system data from the energy generating systems at a gateway that is operating as a common gateway;
  managing the system data in the gateway and processing the request data in the gateway;

sending control commands to the energy generating systems and/or data responses to the system control units that result from the processing of the request data via the gateway;

receiving the request data in at least two different data models of the individual system control units and/or receiving the system data in at least two different data models of the individual energy generating systems at the gateway;

translating the request data and the system data from their respective data models into a metadata model in the gateway;

managing the translated system data in the gateway and processing the translated request data in the gateway, wherefrom data responses compiled from system data to specific system control units and/or control commands to specific energy generating systems result in the metadata model;

translating the data responses and/or control commands from the metadata model into the data models of the specific system control units and/or energy generating systems in the gateway; and transmitting the translated data responses and/or control commands by the gateway to the specific system control units and/or energy generating systems.

2. The method as claimed in claim 1, further comprising taking into account, in the gateway, a network model of the supply network and of the feeding-in energy generating systems during the processing of the request data.

3. The method as claimed in claim 1, wherein the gateway, in the absence of corresponding request data from system control units, transmits control commands to the energy generating systems that ask for system data from the energy generating systems.

4. The method as claimed in claim 1, wherein state data from measuring devices are received at the gateway and are translated from their respective data model into the metadata model in the gateway, and wherein the translated state data are managed in the gateway.

5. The method as claimed in claim 1, further comprising receiving and taking into account weather forecast data at the gateway during the processing of the request data of the system control units and/or during the sending of the control commands to the energy generating systems by the gateway.

6. The method as claimed in claim 1, wherein the request data comprise such request data for which resulting control commands are transmitted in a temporal sequence by the gateway and/or repeatedly by the gateway until an objective defined in the request data is achieved.

7. The method as claimed in claim 1, wherein the request data from different system control units are checked for collisions before and/or during processing and, in the event of collisions occurring, are fed jointly to a collision eliminating routine.

8. The method as claimed in claim 1, wherein at least one of the system control units is a further gateway, to which the gateway is connected as an energy generating system.

9. The method as claimed in claim 1, wherein the request data comprise requests for compliance with at least one network parameter at at least one point of the supply network.

10. The method as claimed in claim 9, wherein the network parameter is a phase angle and/or a voltage and/or a frequency and/or the distribution thereof over the supply network.

11. The method as claimed in claim 1, wherein the request data comprise requests for communication of operating data of the totality of the energy generating systems or of a subset of the energy generating systems that is defined generically in the request data.

12. The method as claimed in claim 1, wherein the system data comprise identification data and present operating parameters of the energy generating systems.

13. The method as claimed in claim 12, wherein the system data furthermore comprise generic descriptions of the respective energy generating system and/or position indications that indicate at what point the respective energy generating system is connected to the supply network.

14. The method as claimed in claim 12, wherein the system data in the case of energy generating systems in the form of PV systems furthermore comprise indications concerning the geographical position and/or concerning the alignment of the PV generator assigned to the PV system.

15. The method as claimed in claim 1, wherein the request data and/or the system data and also the translated data responses and/or control commands are received and/or transmitted to the specific system control units and/or energy generating systems by the gateway via protected data connections.

16. The method as claimed in claim 1, wherein the request data from and the data responses to different system control units and/or the system data from and the control commands to different energy generating systems are received and transmitted in accordance with at least two different communication protocols and/or via at least two separate data ports to the system control units and/or energy generating systems.

17. The method as claimed in claim 1, wherein the gateway independently generates control commands to the energy generating systems in order to pursue an objective stored in the gateway and/or a global objective defined in the request data of the system control units.

18. A data server comprising a processor as a gateway, wherein the processor is configured and programmed to perform, upon executing instructions of a program, acts for the communication of system control units with a plurality of spatially distributed energy generating systems, which jointly feed into a continuous supply network for electrical energy, wherein the processor is configured to:

receive request data from the system control units and system data from the energy generating systems at the gateway as a common gateway;

manage the system data in the gateway and process the request data in the gateway;

send control commands to the energy generating systems and/or data responses to the system control units that result from the processing of the request data via the gateway;

receive the request data in at least two different data models of the individual system control units and/or receive the system data in at least two different data models of the individual energy generating systems at the gateway;

translate the request data and the system data from their respective data models into a metadata model in the gateway;

manage the translated system data in the gateway and process the translated request data in the gateway, wherefrom data responses compiled from system data to specific system control units and/or control commands to specific energy generating systems result in the metadata model;

translate the data responses and/or control commands from the metadata model into the data models of the specific system control units and/or energy generating systems in the gateway; and transmit the translated data responses and/or control commands by the gateway to the specific system control units and/or energy generating systems.

* * * * *